United States Patent
Engstrom

(10) Patent No.: US 7,334,267 B2
(45) Date of Patent: Feb. 19, 2008

(54) EMAIL VIEWING SECURITY

(75) Inventor: G. Eric Engstrom, Kirkland, WA (US)

(73) Assignee: Hall Aluminum LLC, Los Altos, CA (US)

( * ) Notice: Subject to any disclaimer, the term of this patent is extended or adjusted under 35 U.S.C. 154(b) by 831 days.

(21) Appl. No.: 09/796,768

(22) Filed: Feb. 28, 2001

(65) Prior Publication Data
US 2002/0120869 A1 Aug. 29, 2002

(51) Int. Cl.
H04L 9/32 (2006.01)
H04L 9/00 (2006.01)

(52) U.S. Cl. .................. 726/27; 726/2; 705/50

(58) Field of Classification Search ........... 709/206; 726/2
See application file for complete search history.

(56) References Cited
U.S. PATENT DOCUMENTS 5,958,005 A * 9/1999 Thorne et al. ............ 709/202
6,356,937 B1 * 3/2002 Montville et al. ......... 709/206
6,477,647 B1 * 11/2002 Venkatraman et al. ..... 713/193
6,836,846 B1 * 12/2004 Kanevsky et al. ......... 713/193
2002/0042838 A1 * 4/2002 Tabayoyon et al. ....... 709/237

OTHER PUBLICATIONS

Network Associates, Inc., "PGP Desktop Security for Windows 95, Windows 98, Windows NT & Windows 2000, User's Guide", Version 7.0, Sep. 2000, p. 40-46, 79, and 99-112.*

* cited by examiner

Primary Examiner—Kambiz Zand
Assistant Examiner—Peter Poltorak
(74) Attorney, Agent, or Firm—Schwabe, Williamson & Wyatt, P.C.

(57) ABSTRACT

An email program/service is enhanced to facilitate one or more email viewing related security measures. These viewing related security measures may include viewer confirmation and/or viewing limitation. The email program/service is enhanced to enable an email sender to select one or more of these viewing security measures to protect an email being prepared for transmission. The email program/service is further enhanced to facilitate viewing of an email having at least one of these viewing security measures selected, permitting viewing only if the security requirements are met.

23 Claims, 8 Drawing Sheets

Email 400

| Header ~ 402<br>- Viewer Security Properties<br>~ 405 | Body ~ 404 | EOF<br>~ 403 |

Properties = Viewer Confirmation Flag ~ 406;
Viewing Limit Flag ~ 408; Viewing Limit ~410,
# of Viewing Counter ~ 412

500

EMAIL VIEWING SECURITY

BACKGROUND OF THE INVENTION

1. Field of the Invention

The present invention relates to the field of data processing security. More specifically, the present invention relates to email viewing security.

2. Background Information

With advances in integrated circuit, microprocessor, networking and communication technologies, increasing number of devices, in particular, digital computing devices, are being interconnected together. The increased interconnectivity of computing devices have led to wide spread adoption of various network dependent applications, such as the world wide web and email.

Ever since the beginning of computing, data security has always been a concern of the users as well as the system administrators. The concern applies equally to emails. Unfortunately, under the prior art, protection of emails has primarily been confined to system access control, i.e. password protected log-in to access an email system, or encryption. While both measures are useful, the former is not always effective, as it is well known that many users leave their systems unattended after log in, and do not employ password protected screen savers. As to encryption, most novice or even moderately sophisticated users find encryption difficult to use, as typically, one has to register with an encryption key service and have a public/private key arrangement established.

Recently, some email programs/services also offer auto destruction, i.e. upon viewing of an email, the email will be automatically "discarded", or auto expiration by date, i.e. an email automatically becoming unavailable after an expiration date specified by the email sender. Depending on individual needs and preferences, some users find auto destruction too rigid, others find expiration on a date certain basis does not meet their needs, e.g. different recipients may be out of office or on vacation for different lengths of time.

Regardless, history has taught us that there is no end to meeting security needs. It is an evolving process, and new challenges emerge from time to time. Thus, additional easy-to-use security measures, even of limited effectiveness, are desirable.

SUMMARY OF THE INVENTION

An email program/service is enhanced to facilitate one or more email viewing related security measures. These viewing related security measures may include viewer confirmation and/or viewing limitation. The email program/service is enhanced to enable an email sender to select one or more of these viewing security measures to protect an email being prepared for transmission. The email program/service is further enhanced to facilitate viewing of an email having at least one of these viewing security measures selected, permitting viewing only if the security requirements are met.

In various embodiments, the email program/service is implemented by way of a client/server architecture. In one embodiment, the enhancements are made to the client, in another, to the server, and in yet another, distributively to both the client and the server.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a processor based device, using terms such as data, tables, requesting, selecting, receiving, displaying, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, micro-controllers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Overview

Figure 1:
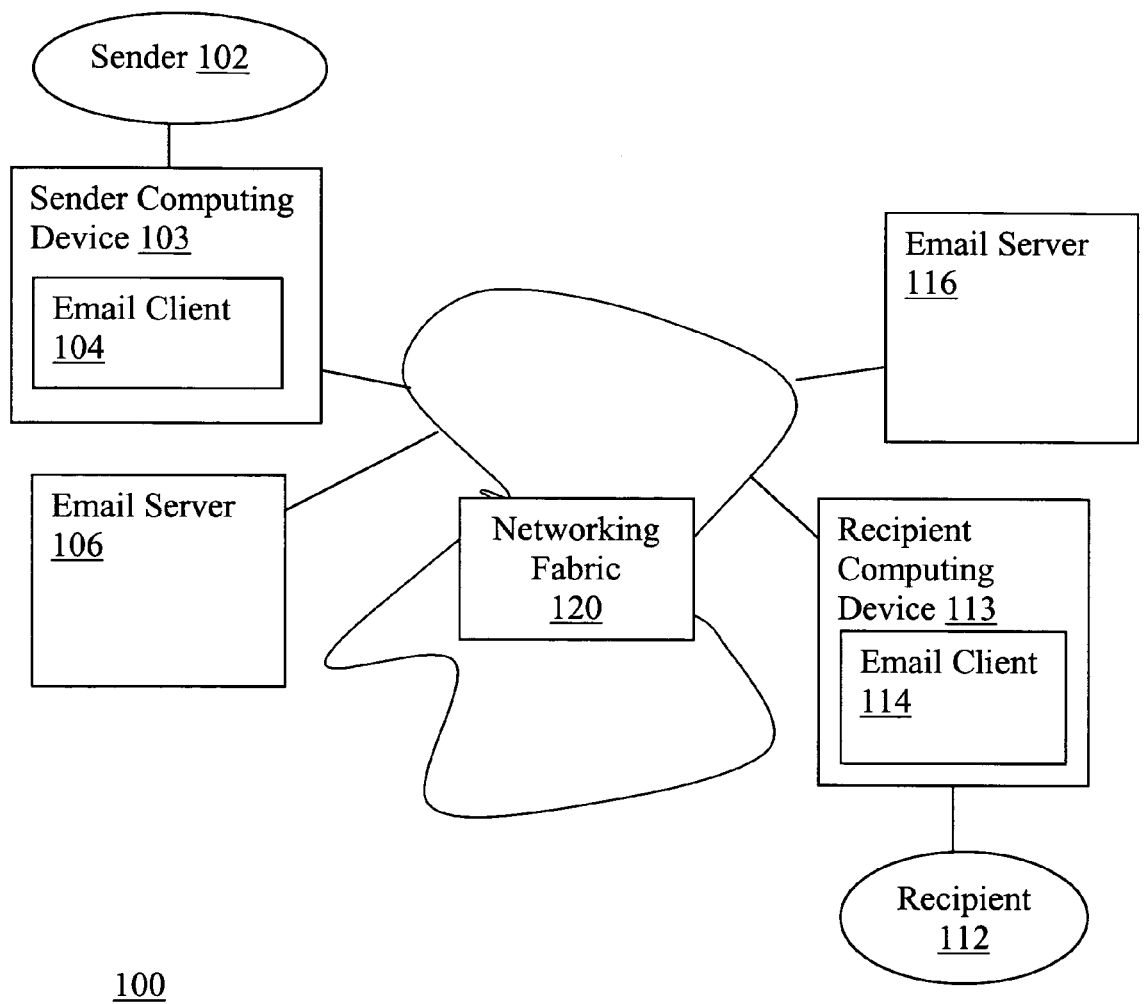
FIG. 1 illustrates a network view of the present invention, including an email sender and an email recipient, each provided with an enhanced email client, in accordance with one embodiment.
Figure 2:
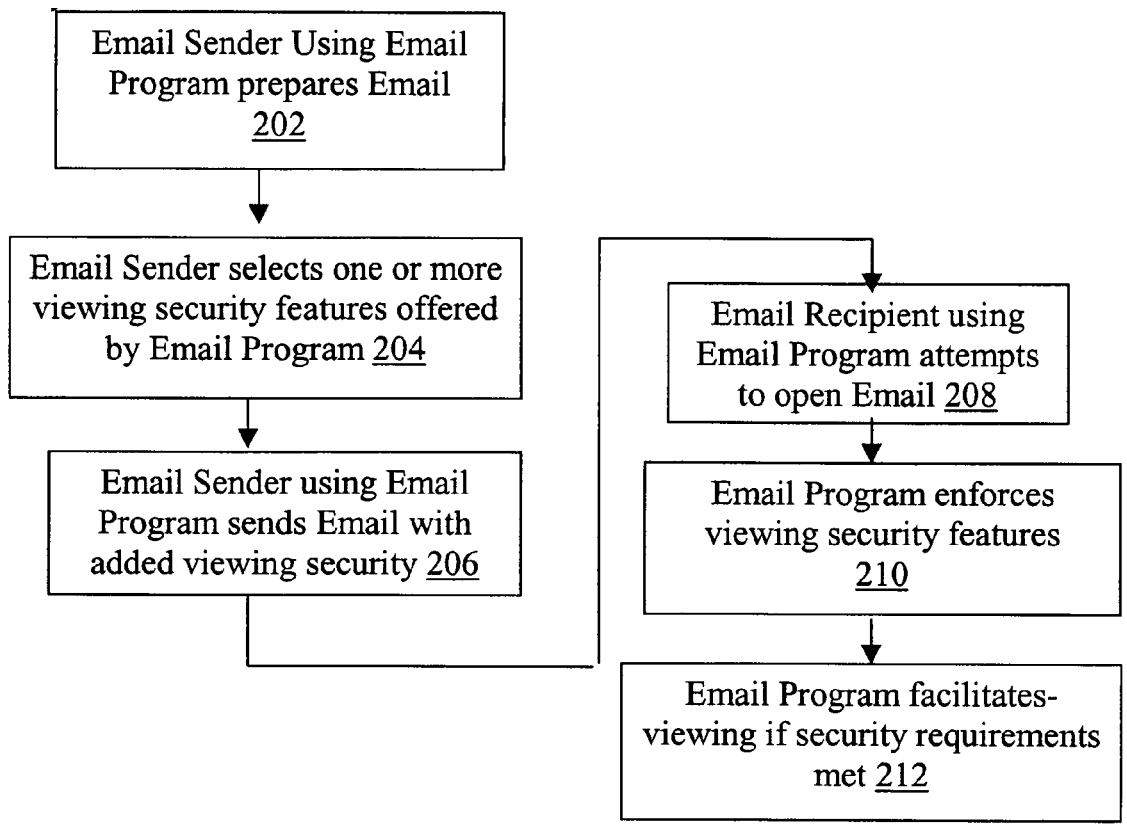
FIG. 2 illustrates a method view of the same invention, in accordance with one embodiment.

Referring now first to FIGS. 1-2, wherein two block diagrams illustrating a network view and a method view of the present invention, in accordance with one embodiment, are shown. As illustrated in FIG. 1, computing equipment 103 and 113 of email sender 102 and email recipient 112 respectively, and email servers 106 and 116 are interconnected with each other through networking fabric 120. Computing equipment 103 and 113 of email sender 102 and email recipient 112 respectively, are correspondingly provided with enhanced email clients 104 and 114 incorporated with the teachings of the present invention. Together, these elements facilitate practice of the email viewing security measures of the present invention.

As illustrated in FIG. 2, under the present invention, email sender 102 using enhanced computing equipment 103 and email client 104 (supported by email server 106) prepares an email for transmission to one or more recipients, block 202. In accordance with the present invention, email client 104 is enhanced to be able to offer email sender 102 for his/her selection one or more individual email based viewing security measures to safeguard viewing of the content of the email being prepared. In one embodiment, the individual email based viewing security measures include a viewer confirmation security measure and a viewing limit security measure. The viewer confirmation security measure safeguards an email by requiring a viewer to reconfirm his/her viewing eligibility, whereas the viewing limit security measure safeguards an email by allowing the sender to specify the maximum number of times the email may be open for viewing. In one embodiment, the above described offer is made in response to a user's indication of interest in securing the email being prepared. Further, both the viewer confirmation security measure and the viewing limit security measure are offered.

At block 204, email sender 102 selects one or more of the individual email based viewing security measures offered, i.e. the viewer confirmation security measure and/or the viewing limit security measure. In response, email enhanced email client 104 secures the email accordingly, and then sends the secured email to the addressee recipients (in response to email sender's direction), block 206. In one embodiment, enhanced email client 104 secures the email by annotating the email with the viewing security information, specifying the viewing security measures the email is to be accorded, and if applicable, the associated parameters.

Eventually, an email recipient 112, upon having received the email, attempts to open and view the email, block 208. In response to such an attempt to open and view the email, enhanced email client 114 enforces the selected viewing security measure or measures, and permits the email to be open for viewing only if all the selected viewing security requirements are met, block 210.

Thereafter, if enhanced email client 114 determines that the selected viewing security requirements are met, enhanced email client 114 permits and services viewing of the email, block 212.

These and other aspects of the present invention will be described in further detail below.

Returning briefly to FIG. 1, equipment 103 and 113 employed by email sender 102 and recipient 112 may be any one of a broad range of email hosting capable equipment known in the art. Examples of such equipment include but are not limited to computers of various form factors, desktop, laptop, palm sized, as well as personal digital assistants (PDA), set-top box, and wireless mobiles phones known in the art. Except for the teachings of the present invention incorporated, email client 104/114 and email server 106/116 are intended to represent a broad range of client/server email clients/services known in the art. Email clients 104 and 114 represent a broad range of email specific client implementations known in the art, such as Lotus Notes and Outlook Express clients available from IBM of Armonk, N.Y., and Microsoft Corp. of Redmond, Wash., respectively. However, as will be appreciated by those skilled in the art, in alternate embodiments, "email clients" 104 and 114 may also be a generic client, such as a browser, used for email as well as other applications. The generic client, when used for email application, is used to render an email application or service's user interface (typically implemented via web pages and/or applets), and the email application/service is executed on the "remote" server (typically implemented as scripts and the like). An example of email applications/services employing a generic client is Hotmail offered by Microsoft Network of Redmond, Wash. Thus, depending on the embodiments, the enhancements to email clients 104 and 114 described herein, may be implemented on the client side, the server side, or distributively on both the client side and the server side.

Email Sender

Figure 3A:
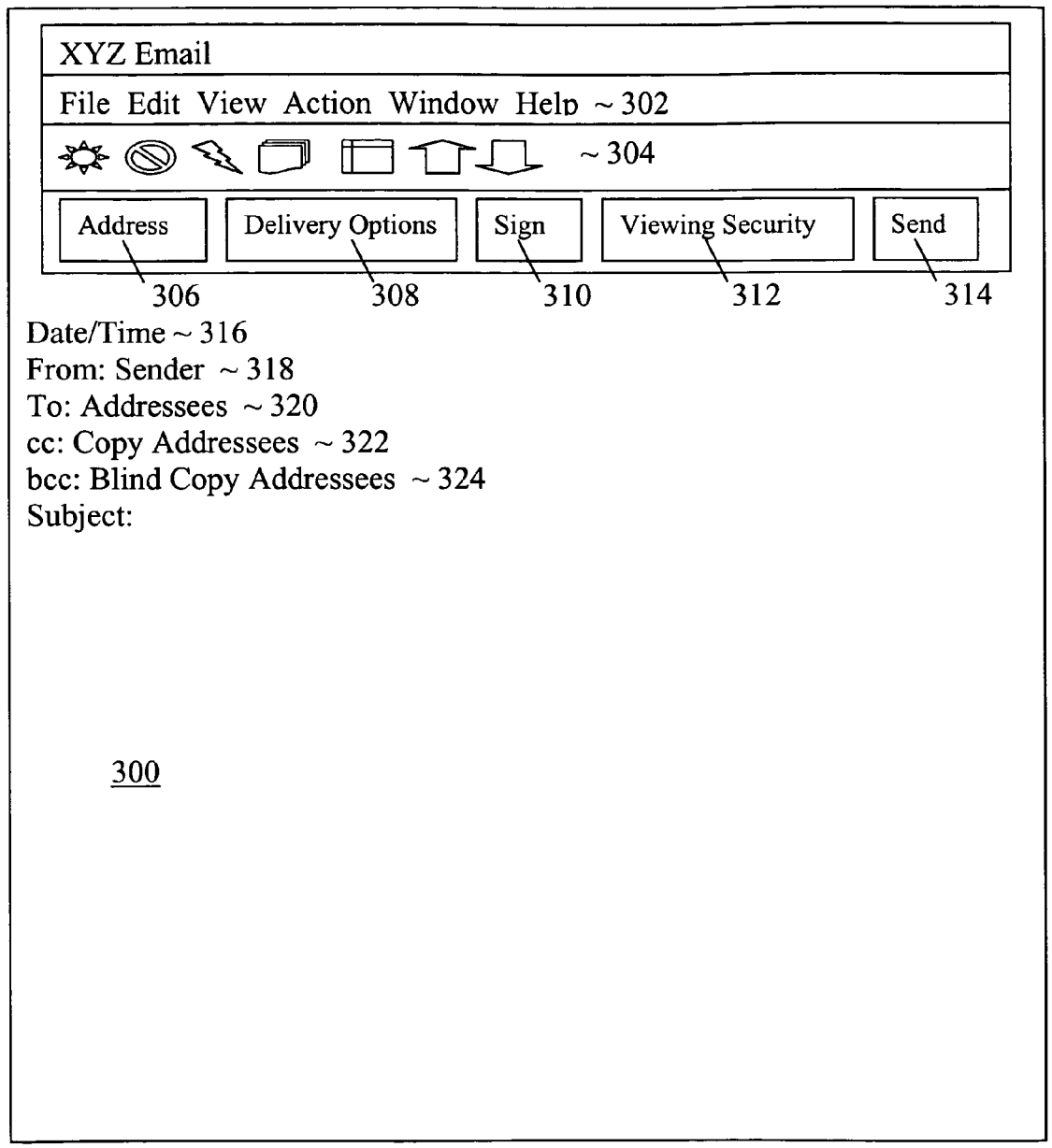
FIGS. 3a-3b illustrate an user interface suitable for use to practice the present invention at the email sender end, in accordance with one embodiment.
Figure 3B:
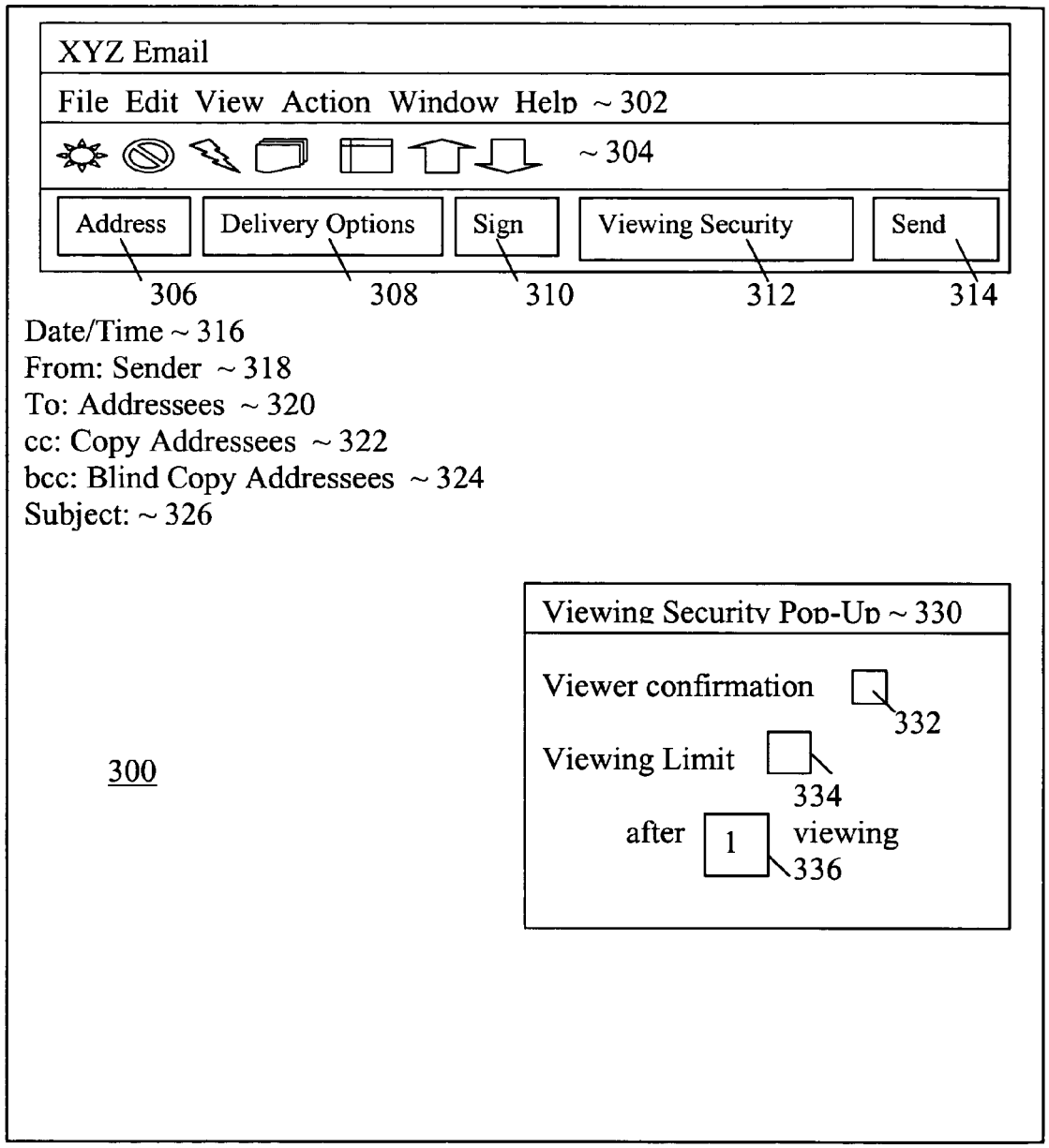

FIGS. 3a-3b illustrate an example end user interface suitable for use to practice the email sender aspect of the present invention, in accordance with one embodiment. As illustrated in FIG. 3a, example end user interface 300 includes menu 302 of "drop down" commands, i.e. "File", "Edit" and so forth, menu 304 of action icons, a number of command buttons 306-314, and date/time, from, to and copy addressee fields 316-324. In particular, command buttons 306-314 include "viewing security" command button 312.

As illustrated in FIG. 3b, enhanced email client 104, in response to a user selection of "viewing security" button 312, offers email sender 102 one or more individual email based viewing security measures for securing the email being prepared. For the illustrated embodiment, the individual email based viewing security measures include at least a selected one of the earlier described viewer confirmation and viewing limit security measures, offered to email sender 102 via selection check boxes 332-334 respectively, of pop-up window 330. Further, the viewing limit security measure has associated with it a limit parameter (settable by email sender 102 via selection box 336), beyond which the email being prepared will become inaccessible, i.e. unavailable for viewing. As described earlier, the viewer confirmation security measure requires an enhanced email client to re-confirm a viewer's viewing eligibility before letting the viewer view the requested email, whereas the viewing limit security measure renders an email ineligible for viewing after the number of times the email has been open for viewing has reached the limit specified by the sender.

In alternate embodiments, a default number of viewing limit (e.g. 2) may be provided. Additionally, the individual email viewing security options may be presented automatically (e.g. in response to the sending of the email) rather than being presented in response to a user's selection of a "viewing security" button. Moreover, if a "viewing security" button is employed, it may be implemented as a sub-command of "delivery options" 308 instead.

Figures 4, 5:
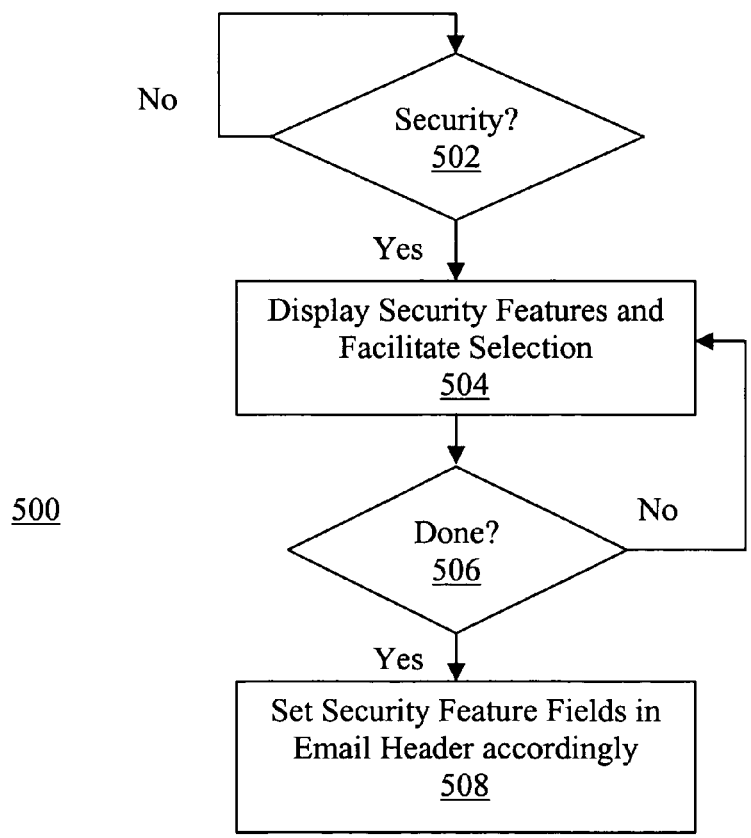
FIG. 4 illustrates an example data organization suitable for use to secure an email per the present invention, in accordance with one embodiment.
FIG. 5 illustrates the operational flow of the relevant aspects of an enhanced email client practicing the present invention at the email sender end, in accordance with one embodiment.

FIG. 4 illustrates an example email organization, suitable for practicing the present invention, in accordance with one embodiment. The illustrated embodiment assumes that enhanced email client 104 safeguards viewing of an email, in response to the email sender's selection of one of the viewing security measures. One way to implement the protection includes specifying the viewing security measures the email is to be accorded by annotating the email with the appropriate viewing security information. As illustrated, example email 400 includes header portion 402, email body 404, and an end-of-file (EOF) marking 403. Header portion 402 contains various control information, in particular, viewer security properties 405. For the illustrated embodiment, security properties 405 include a viewer confirmation flag 406, a viewing limit flag 408, its associated viewing limit 410, and a number of viewing counter 412. If set, viewer confirmation flag 406 denotes a requesting viewer's eligibility is to be confirmed before allowing the email to be viewed. Similarly, if set, viewing limit flag 410 denotes that the email is to be rendered unavailable if the number of viewings of the email has reached the specified limit. Number of viewing counter 412, initially sets to zero, keeps track of the number of the times an email has been viewed.

FIG. 5 illustrates the operation flow 500 of the relevant aspects of the email client executing on the equipment of email sender 102, in accordance with one embodiment. As illustrated, at block 502, the email client awaits for the selection of the "viewing security" command button (312 of FIG. 3a-3b). At block 504, as alluded to earlier, in response to the selection of the "viewing security" command button, enhanced email client 104 presents the security pop-up window(330 of FIG. 3b), including therein a number of individual email based viewing security measures, such as the earlier described viewer confirmation and viewing limit security measures.

Thereafter, enhanced email client 104 awaits email sender 102 to finish his/her selection of the offered viewing security measures, block 506. Eventually, upon completion of the selection, enhanced email client 104 secures the email as described earlier, e.g. annotating the appropriate properties in the header portion of the email, block 508.

Email Recipient

Figure 6:
FIG. 6 further illustrates the user interface of FIGS. 3a-3b, more specifically, for use at a recipient end, in accordance with one embodiment.

FIG. 6 illustrates an example end user interface suitable for use to practice the email recipient aspect of the present invention, in accordance one embodiment. For ease of understanding, end user interface 600 is basically the same end user interface of FIG. 3a-3b, except viewed from an email recipient's perspective, in particular, if the email sender has selected the viewer confirmation viewing security measure. As illustrated, in response to enhanced email client 104 having secured an email specifying that the email is to be accorded viewer confirmation security protection, enhanced email client 114 confirms the viewer's eligibility. In one embodiment, enhanced email client 114 confirms the viewer's eligibility by requiring the viewer to re-login. Enhanced email client 114 causes a re-login request pop-up 640 to be displayed for the email viewing requestor, to reduce the likelihood that the email is viewed by one other than its intended recipient. If enhanced email client 104 has also secured the email, specifying that the viewing limit security measure is to be accorded to the email, re-login popup 640 is presented only if the email is determined to be still available for viewing. That is, re-login popup 640 is presented only if the number of times the email has been viewed has not reached the specified limit. In alternate embodiments, other manners of confirming the email viewing requestor's eligibility may be practiced instead.

Figure 7:
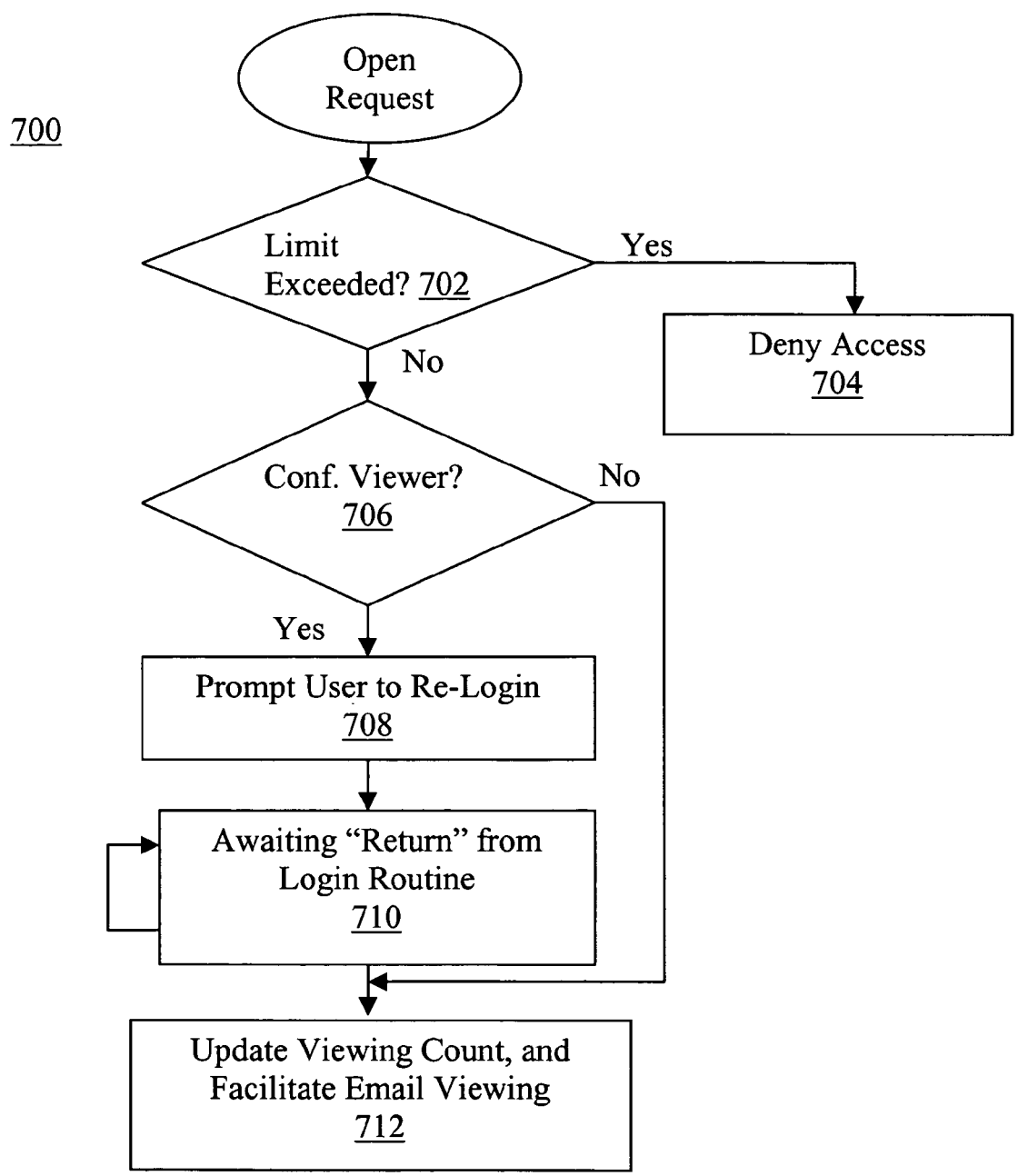
FIG. 7 illustrates the operational flow of the relevant aspects of the enhanced email client practicing the present invention at the recipient end, in accordance with one embodiment.

FIG. 7 illustrates the operation flow 700 of the relevant aspects of the enhanced email client executing on the equipment of email recipient 112, in accordance with one embodiment. As illustrated, upon detecting a request for opening of an email for viewing, at block 702, the email client determines whether the email is available for viewing. That is, whether the email is to be accorded the viewing limit security measure, and if so, whether the specified number of viewing limit has been reached. If the email is not to be accorded the viewing limit security measure, by definition, the number of viewing permitted is unlimited. If a viewing limit is specified and the limit has been reached, enhanced email client 114 denies access to the email, thereby preventing it from being viewed again. In one embodiment, enhanced email client 114 provides the user with a "limit reached" notice. Under this embodiment, the email remains being included among the listed emails. Thus, the user is able to see that an email was received from the email sender (even though its content is no longer available for viewing). If desired, the user can contact the sender to resend the email with a "reset" limit. In an alternate embodiment, email client 114 may check the applicability of the viewing security measure, whether the limit has been reached, and if the limit has been reached, simply exclude the email from being listed among the emails available for viewing.

On the other hand, if the "limit" measure is not be accorded, or the "limit" measure is to be accorded, but the limit has not been reached, enhanced email client 114 determines if the viewer confirmation security measure is to be accorded, block 706. If the viewer confirmation security measure is to be accorded, for the illustrated embodiment, enhanced email client 114 enforces the viewer confirmation security measure by requiring the viewing requestor to re-login. As described earlier, enhanced email client 114 causes the re-login popup to be presented to the viewing requester, block 708. In one embodiment, the presentation of the re-login popup is effectuated using the login services of the underlying operating system. Thereafter, enhanced email client 114 awaits for the return of execution control from the invoked login routine, block 710. Upon being given execution control again, enhanced email client 114 facilitates the requested viewing of the email, block 712.

Under this implementation, if the viewing requestor successfully logins again, thereby allowing execution control to be returned back to enhanced email client 114, the viewer's eligibility is deemed to be valid. Otherwise, if the viewing requester does not login again, execution control will not be returned to enhanced email client 114. The viewing requestor's ineligibility is effectively "determined", and his/her attempt to view the email will be blocked. This effective ineligibility applies equally to eligible recipient who elects to not perform the re-login, for whatever reason.

Further, if the viewing limit security measure is to be accorded, at block 712, enhanced email client 114 further updates the number of times the email has been opened for viewing, once client 114 determines all security requirements are met and opens the email for viewing by the viewing requestor.

Example Computer System

Figure 8:
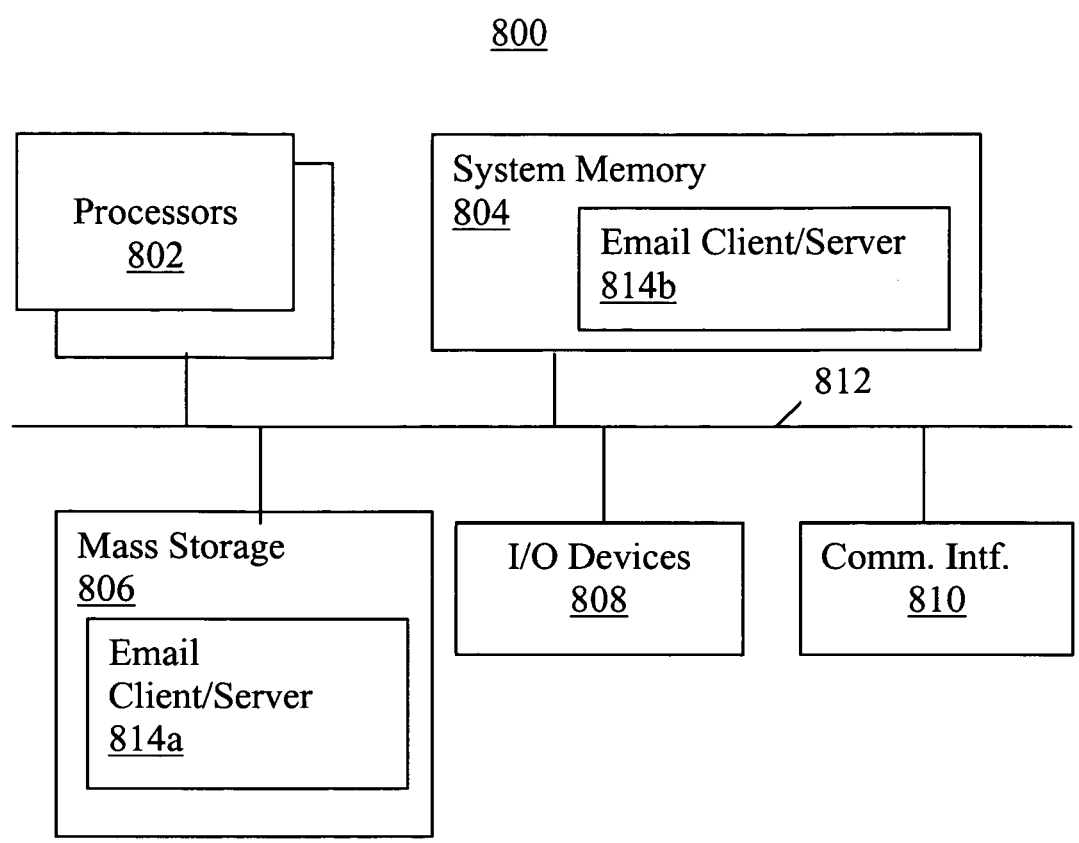
FIG. 8 illustrates an example computer system suitable for use as a sender/recipient computer, in accordance with one embodiment.

FIG. 8 illustrates an exemplary computer system 800 suitable for use as either a sender/recipient computer 103/113 of FIG. 1, in accordance with one embodiment. As shown, computer system 800 includes one or more processors 802 and system memory 804. Additionally, computer system 800 includes one or more mass storage devices 806

(such as diskette, hard drive, CDROM and so forth), one or more input/output devices 808 (such as keyboard, cursor control and so forth) and communication interfaces 810 (such as network interface cards, modems and so forth). The elements are coupled to each other via system bus 812, which represents one or more buses. In the case of multiple buses, they are bridged by one or more bus bridges (not shown). Each of these elements performs its conventional functions known in the art. In particular, system memory 804 and mass storage 806 are employed to store a working copy and a permanent copy of the programming instructions implementing the teachings of the present invention. The permanent copy of the programming instructions may be loaded into mass storage 806 in the factory, or in the field, as described earlier, through a distribution medium (not shown) or through communication interface 810 (from a distribution server (not shown). The constitution of these elements 802-812 are known, and accordingly will not be further described.

Additional Features

The present invention specifically contemplates the usage of the earlier described security features with other conventional security features known in the art, such as initial access control to an email system (e.g. through password protected login), and encryption. The present invention also contemplates that additional measures may be taken such that if the secured email is received by a conventional email program/service, it is nevertheless protected. Examples of such measures include automatic encryption by the sending email program using a key known to compatible email programs or a key that may be symmetrically generated by the compatible email programs.

Conclusion and Epilogue

Thus, it can be understood from the above descriptions, a novel method and apparatus for securing email on a per email basis has been described. While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A method comprising:
providing an email sender with one or more viewing security measures for selection of protection of an email being prepared for transmission by the email sender, the one or more viewing security measures including at least a viewer confirmation security measure that requires a potential viewer's identity be confirmed at a receiver invoking an authentication service associated with the receiver, the authentication service requiring said potential viewer to re-login successfully with a local log-in service of the receiver having identity information of potential viewers, said identity information and said authentication service being independent of the email sender and independent of the email, before allowing viewing of the email;
securing said email in accordance with the selection or selections made by the email sender; and
sending said secured email to a recipient.

2. The method of claim 1, wherein said providing comprises prompting the email sender on whether the email being prepared for transmission is to be protected with the viewer confirmation security measure.

3. The method of claim 1, wherein said one or more viewing security measure further comprise a viewing limit security measure that limits a number of times the email can be viewed, and said providing further comprises prompting the email sender on whether the email being prepared for transmission is to be protected with the viewing limit security measure.

4. The method of claim 3, wherein said providing further comprises facilitating the email sender in specifying the viewing limit to be used with said viewing limit security measure.

5. The method of claim 1, wherein said securing comprises annotating said email to be secured by the selected one or more of said viewing security measures.

6. The method of claim 1, wherein said method further comprises
enforcing the selected one or more of said viewing security measures when servicing a viewing request of said secured email by said recipient.

7. The method of claim 6, wherein said one or more viewing security measure further comprise a viewing limit security measure that limits a number of times the email can be viewed, and said enforcing comprises checking whether the viewing limit has been reached, and if the viewing limit has been reached, denying access to said email.

8. The method of claim 7, wherein said enforcing comprises updating the number of times the email has been viewed.

9. A method comprising:
receiving an email from an email sender addressed to a recipient;
determining if said email is to be secured by one or more viewing security measures, including at least a viewer confirmation security measure that requires a potential viewer's identity be confirmed at a receiver, invoking an authentication service selected by the receiver, said identity information and said selection of authentication service being independent of the viewer confirmation security measure, before allowing viewing of the email; and
enforcing the one or more selected viewing security measures when servicing a viewing request of said secured email by said recipient, wherein said enforcing includes requiring said potential viewer to re-login successfully with a local log-in service having identity information of potential viewers, before servicing said viewing request.

10. The method of claim 9, wherein said one or more viewing security measure further comprise a viewing limit security measure that limits a number of times the email can be viewed, and said enforcing comprises checking whether the viewing limit has been reached, and if the viewing limit has been reached, denying access to said email.

11. The method of claim 9, wherein said enforcing comprises updating the number of times the email has been viewed.

12. An apparatus comprising:
a storage medium having stored therein a plurality of programming instructions designed to enable said apparatus to provide an email sender of said apparatus one or more viewing security measures for selection of protection of an email being prepared for transmission by the email sender user, to secure said email in accordance with the selection or selections made by the email sender, and to send said secured email to a recipient, wherein said viewing security measures include at least a viewer confirmation security measure that requires a potential viewer's identity be confirmed at a receiver invoking an authentication service associated with the receiver, the authentication service requiring said recipient to re-login successfully with a local log-in service of the receiver having identity information of potential viewers, said identity information and said authentication service being independent of the email sender and independent of the email, before allowing viewing of the email; and a processor coupled to the storage medium to execute the programming instructions.

13. The apparatus of claim 12, wherein said programming instructions are designed to enable the apparatus to prompt the email sender on whether the email being prepared for transmission is to be protected with the viewer confirmation security measure.

14. The apparatus of claim 12, wherein said one or more viewing security measure further comprise a viewing limit security measure that limits a number of times the email can be viewed, and said programming instructions are designed to enable the apparatus to prompt the email sender on whether the email being prepared for transmission is to be protected with the viewing security measure.

15. The apparatus of claim 14, wherein said one or more viewing security measure further comprise a viewing limit security measure that limits a number of times the email can be viewed, and said programming instructions are further designed to enable the apparatus to facilitate the email sender to specify a viewing limit to be used with said viewing security measure.

16. The apparatus of claim 12, wherein said programming instructions are designed to enable the apparatus to annotate said email to be secured by the selected one or more of said viewing security measures.

17. The apparatus of claim 12, wherein said programming instructions are further designed to enable the apparatus to enforce the selected one or more of said viewing security measures when servicing a viewing request of said secured email by said recipient.

18. The apparatus of claim 12, wherein said one or more viewing security measure further comprise a viewing limit security measure that limits a number of times the email can be viewed, and said programming instructions are designed to enable the apparatus to check whether the viewing limit of said email has been reached, and if the viewing limit of said email has been reached, denying access to said email.

19. The apparatus of claim 12, wherein said apparatus is a selected one of a desktop computer, a notebook sized computer, a palm sized personal digital assistant, a wireless mobile phone, and a set-top box.

20. An apparatus comprising:

a storage medium having stored therein a plurality of programming instructions designed to enable the apparatus to receive an email from an email sender addressed to a recipient user of the apparatus, said email to be secured by one or more selected viewing security measures, and to enforce the selected one or more of said viewing security measures when servicing a viewing request of said secured email by said recipient user, wherein said viewing security measures include at least a viewer confirmation security measure that requires a potential viewer's identity be confirmed at a receiver invoking an authentication service associated with the receiver, and the authentication service requires the recipient user to re-login successfully with a log-in service having identity information of potential viewers, before servicing said viewing request, and the local login-service is the identity authentication mechanism, and said identity information and said authentication service being independent of the email sender and independent of the email, before allowing viewing of the email; and at least one processor coupled to said storage medium to execute said programming instructions.

21. The apparatus of claim 20, wherein said one or more viewing security measure further comprise a viewing limit security measure that limits a number of times the email can be viewed, and said programming instructions are designed to enable the apparatus to check whether the viewing limit has been reached, and if the viewing limit has been reached, denying access to said email.

22. The apparatus of claim 21, wherein said programming instructions are designed to enable the apparatus to update the number of times the email has been viewed.

23. The apparatus of claim 20, wherein said apparatus is a selected one of a desktop computer, a notebook sized computer, a palm sized personal digital assistant, a wireless mobile phone, and a set-top box.

* * * * *